United States Patent
Blackwell et al.

(10) Patent No.: US 8,392,601 B2
(45) Date of Patent: *Mar. 5, 2013

(54) NETWORK ESTABLISHMENT AND MANAGEMENT PROTOCOL

(75) Inventors: Robin J. Blackwell, Redhill (GB); Neil A. Hankin, Smallfield (GB); Peter J. Lanigan, Croydon (GB); Nicoll B. Shepherd, Coulsdon (GB); Philip A. Rudland, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 1187 days.

This patent is subject to a terminal disclaimer.

(21) Appl. No.: 10/523,380

(22) PCT Filed: Jul. 24, 2003

(86) PCT No.: PCT/IB03/03304
§ 371 (c)(1),
(2), (4) Date: Feb. 1, 2005

(87) PCT Pub. No.: WO2004/015928
PCT Pub. Date: Feb. 19, 2004

(65) Prior Publication Data
US 2006/0041649 A1   Feb. 23, 2006

(30) Foreign Application Priority Data
Aug. 6, 2002 (GB) .................................. 0218174.1
Apr. 25, 2003 (GB) .................................. 0309404.2

(51) Int. Cl.
*G06F 15/16* (2006.01)

(52) U.S. Cl. ....................................................... 709/236
(58) Field of Classification Search ................... 709/236
See application file for complete search history.

(56) References Cited

U.S. PATENT DOCUMENTS

| 5,991,713 A | 11/1999 | Unger et al. ....................... 704/9 |
| 6,349,325 B1 | 2/2002 | Newcombe et al. ........... 709/202 |
| 6,349,352 B1 | 2/2002 | Lea |
| 7,089,530 B1 * | 8/2006 | Dardinski et al. ............. 717/105 |
| 2002/0029256 A1 * | 3/2002 | Zintel et al. .................... 709/218 |
| 2002/0046266 A1 | 4/2002 | Muralidhar et al. |
| 2003/0023628 A1 * | 1/2003 | Girardot et al. ................ 707/513 |
| 2003/0112958 A1 * | 6/2003 | Beaudoin et al. ......... 379/221.15 |

FOREIGN PATENT DOCUMENTS

| JP | 2001202304 A | 7/2001 |
| JP | 2002501240 A | 1/2002 |
| WO | 0201833 A1 | 1/2002 |

OTHER PUBLICATIONS

"WAP Binary XMLcontent Format", http://www,.w3.org/1999/06/NOTE-wbxml-1000-624, W3C Note Jun. 24, 1999, 21 Pages.

* cited by examiner

Primary Examiner — Ryan Jakovac

(57) ABSTRACT

The invention relates to a protocol for communications between networked devices. The devices are logically arranged as a hierarchy of device types including a controller device type (52) from which no other device type depends and a basic device type (54) from which a number of other device types depend. The devices implement a simple device description message of fixed length and format which includes the device type, and some devices further implement an extended device description message including additional information.

21 Claims, 8 Drawing Sheets

NETWORK ESTABLISHMENT AND MANAGEMENT PROTOCOL

This invention relates to a network protocol, and in particular to implementations of the protocol.

A prior art protocol for network management is universal plug and play (UPnP), which is very useful for internet applications where bandwidth, battery consumption, and to an extent cost, are not an issue. Implementations of the protocol in consumer electronics (CE) do exist, but because of the extent of the protocol, such implementations impose a heavy load especially on the simplest devices that otherwise would require only minimal processing capability.

The need therefore exists for a protocol suitable for embedding in simple devices such as lights, thermostats and CE equipment (remote control for TV's, DVD's and PVR's), that is simple and cost effective to implement, requires the minimum of bandwidth, yet is scalable across a range of devices with varying capabilities.

This need is not restricted to wireless application, but extends to wired applications.

According to a first aspect of the invention there is provided a simple device description message signal including the following data: a device type; a field indicating if the sending device has an extended device description available; and a defined number of additional fields identifying a defined number of additional status settings, wherein the device type is selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type.

It will be noted that although there is at least one hierarchy depending from a basic device type, i.e. a hierarchy of controlled devices, there is no corresponding hierarchy of controller devices. This is to keep the simple device description messages as short and simple as possible—many controllers, such as a universal remote control, are capable of controlling a number of different device types.

The Simple Device Description includes a small or moderate number of predetermined fields each field being of fixed length. In general, the same fields will be used for each message, although there may be some variation. For example, a composite device may include an additional integer field including the number of sub-devices as explained below.

Some of the additional fields may be optional. For example, the message may include a field to indicate the number of sub-devices of a composite device. To reduce network overhead, this field may be included only in the case of a message with the device type recorded as composite.

The present application relates, in a particularly preferred embodiment, to a protocol that will be referred to as home uniform control language (HUCL). The message signal implements the simple functionality provided by HUCL.

Preferably, the simple device description message is in the form of a token-compressed message. According to the HUCL protocol, the underlying message format is a human readable format, such as XML. However, to save bandwidth, messages are passed between networked devices in compressed form. A networked device is nevertheless able to process such compressed messages, because the compression method used is token compression, which replaces common strings with tokens. The networked device can thus recognise the compressed tokens without decompression, at least enough to recognise a query requiring a response of a simple device description, and then respond with a simple device description. Thus, a networked device can be implemented with little overhead.

A suitable form of token coding is described in "wap binary XML content format" of 24 Jun. 1999, available at http://www.w3.org/TR/wbxml.

In a second aspect, the invention relates to a method of operation of a networked device, including: transmitting or receiving a simple device description message of defined length, the simple device description message being in the form of a token-compressed message compressed from a human-readable message format, the message including a device type value representing the type of the other device; the device type value being selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type.

In a third aspect, the invention relates to a corresponding device, including a message handler arranged to send or receive simple device description message of defined length, the simple device description message being in the form of a token-compressed message compressed from a human-readable message format, the message including a device type value representing the type of the other device; the device type value being selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type.

The method of operation of the networked device may relate to a networked device that responds to incoming query messages with suitable responses. Thus, the method may include receiving a simple device description query message from another device requesting a simple device description; and transmitting to the other device the simple device description message of fixed length.

The invention also relates to a method of determining the device type of another device, and accordingly the invention may include the steps of: establishing the address of at least one other device; sending a simple device description query message to the other device or one or more of the other devices requesting a simple device description; and receiving from the other device or devices the simple device description message.

In order to find more information than is available in the simple device description query messages, the method may further include sending an extended device description query message to the other device or one of the other devices requesting an extended device description from the other devices; and receiving from the other device or the one of the other devices an extended device description of variable length.

The method of operation may in particular relate to a controller device having a list of device types that the controller can control.

A controller device according to the invention preferably includes a control input, and controls other devices based on signals received on the control input. Further, the controller device may implement one or more ways of determining what devices the controller can control.

One approach to deal with the lack of information given by the fact that a device is a controller device type is for the controller device to have the functionality to respond to an incoming controller query message querying whether the controller can control a predetermined device type by responding with the lowest level of device type in the list of device types that can be controlled by the networked device that either is the predetermined device type or is a higher level device type from which the predetermined device type depends. The controller device can then send control signals selected from a predetermined list of control signals to other devices in accordance with signals received on the control input.

Instead of being a controller device, the device may be a controlled device having a device type of the basic device type or a device type depending from the basic device type; the networked device having the capability of responding to basic device instructions sent by a controller, the instructions including at least a predetermined base set of instructions.

In order to cope with multifunctional devices, the predetermined top level elements may include a composite device type.

Networked devices of the composite device type have the functionality of a predetermined number of other device types, and are arranged to respond to an incoming device query message requiring a simple device description by sending a simple device description including the device type as a composite device and the instantaneous number of other device types.

The networked device may include a memory storing a predetermined simple device description message, wherein the description message is a message pre-compressed from a message in human readable form including a device type; a flag indicating if the sending device has an extended device description available; and a predetermined number of additional flags identifying a predetermined number of additional status settings. Thus, rather than generating a simple device description message internally, a suitable message is pre-stored and sent out when required.

In a further aspect, the invention relates to a system comprising: a plurality of networked devices each having a transceiver for sending and receiving network messages, the networked messages including device description messages identifying the device type of a networked device; wherein each networked device has a predetermined device type selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type; at least one of the networked devices has a controller device type; and at least one of the networked devices has a device type of the basic device type or a device type depending from the basic device type.

The system may include a number of simple devices, with simple functionality and no capability to decompress messages, and more complex devices that decompress messages to interpret them and operate on them. The more complex devices can have much more complex functionality, at the expense of increased overhead and processor power requirement.

The system may further include at least one networked device of the composite device type having the functionality of a predetermined number of other devices, the predetermined number being an integer greater than or equal to 2; and each of the at least one networked device of the composite device type responds to an incoming device query message requiring a simple device description by sending a simple device description including the device type as a composite device and a sub-device number representing the predetermined number of other devices.

The invention also relates to a computer program defining a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type, the computer program being arranged to cause a networked device to send and/or receive simple device description messages including the device type selected from the device type hierarchy.

The computer program may in particular include: code implementing a transport adaption layer for interfacing with the transport stack; code implementing an application programming interface for interfacing with the application; and code implementing a messaging layer including the capabilities of sending and receiving messages in a token-encoded human readable messaging format, the code being arranged to cause the networked device: to recognise incoming device query messages requiring a simple device description response and to provide a simple device description response including a device type of controller device type; to respond to an incoming controller query message querying whether the networked device can control a predetermined device type by responding with the lowest level of device type in the list of device types that can be controlled by the networked device that either is the predetermined device type or is a higher level device type from which the predetermined device type depends; and to carry out the steps of: sending a device query message to another device; receiving a response from the other device indicating the device type of the other device, the device type being selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type; determining the extent to which the networked device can control the other device by determining the lowest level of device type that either is the device type of the other device or is a higher level device type from which the device type of the other device depends, in the list of device types that can be controlled by the networked device; and controlling the other device with the functionality of the determined lowest level of device type by sending control signals selected from a list of control signals appertaining to the determined lowest level of device type.

For a better understanding of the invention, embodiments will now be described purely by way of example, with reference to the accompanying drawings in which.

The protocol HUCL is a lightweight, low bandwidth control protocol primarily designed for wireless systems. The messaging format is based on XML, and messages are compressed prior to transmission. The use of XML provides an extensible and scalable solution with the compression reducing the data sent, so reducing the amount of time the transmitter is on and consuming power.

The general principles of the HUCL protocol and how it would operate on a device will now be discussed with reference to a simple example.

Figure 1:
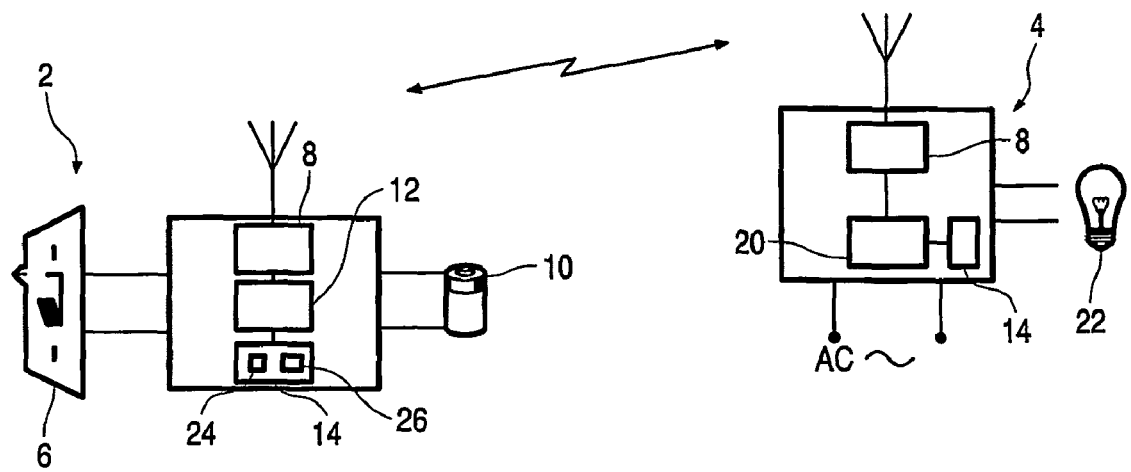
FIG. 1 shows a pair of devices communicating using an embodiment according to the invention.

Referring to FIG. 1, a light switch 2 and a light fitting 4 are provided. The light switch 2 has a physical rocker switch 6 operated by the user, together with an RF transceiver 8 and battery 10, together with control circuitry 12 and memory 14. The light fitting also has an RF transceiver 8 and memory 14, but is mains powered and has the control circuitry 20 to apply power to the light bulb 22. The light switch 2 is thus an example of a controller which has a control input 6 (the switch), whereas the light fitting is an example of a controlled device 4. The memory 14 in the controller includes a list 24 of device types that the controller can control, and control functions appertaining to the device types. The memory 14 in both controlled 4 and controller 2 devices also contains code 26 for causing the control circuitry to carry out the methods that will be described in more detail below.

Figure 2:
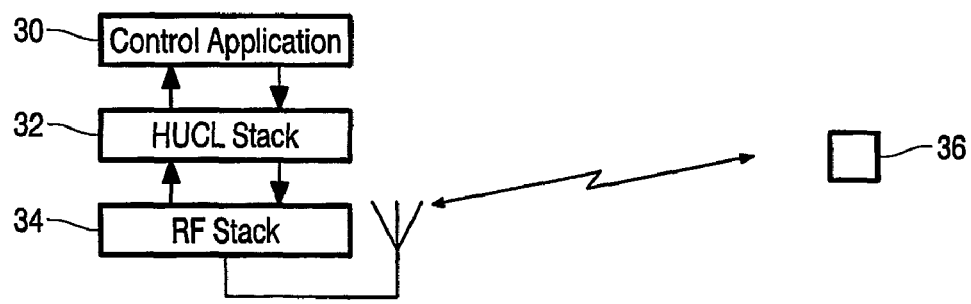
FIG. 2 shows a schematic of the software in one device.

FIG. 2 shows a representation of the software that resides on each of the devices in memory 14. The control application 30 communicates with the HUCL Software Stack 32 when certain events occur.

In a similar way the HUCL Software Stack 32 communicates with the RF Software Stack 34, and the RF Software Stack 34 will communicate back to the HUCL Software Stack 32 when certain events occur e.g. on receipt of data.

Messages 36 are sent and received. The messages may be of a number of types, including a simple device description query message, or any of a number of other message types.

Figure 3:
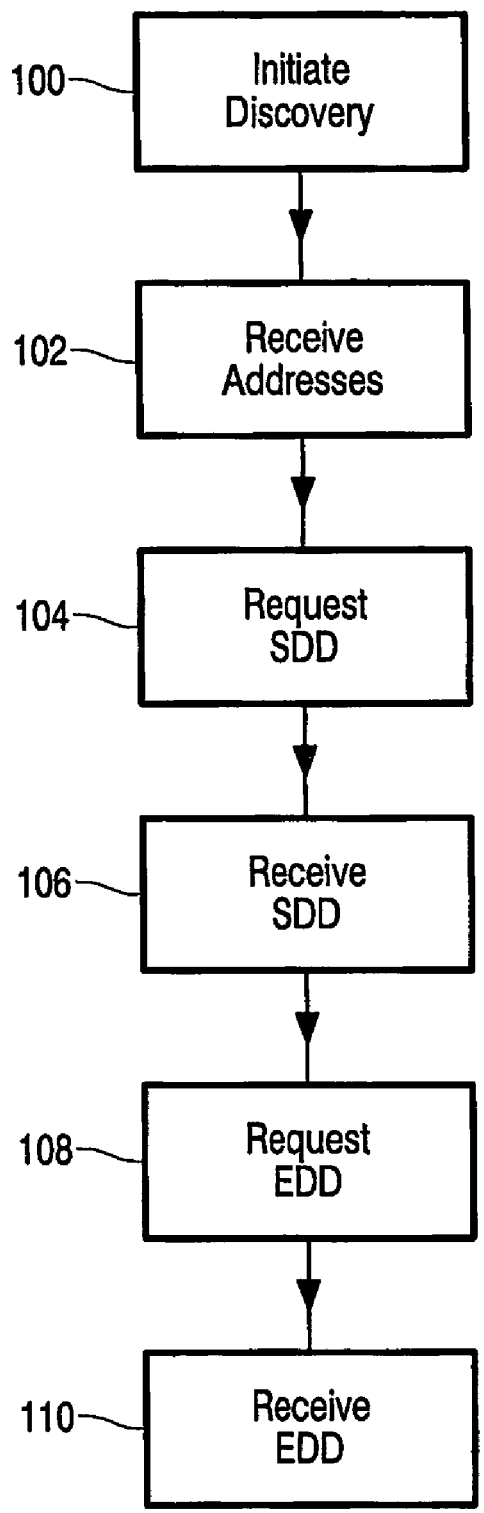
FIG. 3 is a flow diagram of the device discovery process.

The operation of the devices will now be described with reference to FIG. 3. The first phase in the operation of this pair of devices is for the switch to discover the address of the fitting. This is known as device discovery, and it is a requirement of the underlying RF transport stack that device discovery is either provided (in the RF Software Stack), or that it is possible to implement device discovery on top of the transport stack (in the lower layer of the HUCL Software Stack).

The discovery process is initiated 100 by the Control Application (possibly as a result of some user interaction) by performing a call into the HUCL Software Stack requesting firstly the number of known devices, and then the network addresses of those devices. These device addresses are returned.

Depending on the underlying RF protocol, the network addresses may be established in some other way.

The end result of the device discovery phase is that the Control Application is supplied 102 with a list of addresses of all devices known by the RF Stack. At this point in the process the Control Application knows nothing more about each other device other than its address.

It should be noted that although in this described process all device addresses are retrieved before requesting descriptions the skilled person will realise that other possibilities exist. For example, the control application may request a description immediately after receiving each device address, before all device addresses are obtained.

The second phase in the pairing process is for the Control Application to gather information on the devices for which it has addresses. This information is called the device description. The control application does this by making a call into the HUCL Software Stack, passing the address of the device that it requires the device description from.

The request for the simple device description is then passed 104 over the RF link to the destination device, so in the switch/fitting example described above the request is transmitted from the switch to the fitting. On receiving the request, the HUCL Software Stack at the destination device makes a call in to the Control Application requesting the device description. The format of the description is defined. If not already in a compressed form the description is compressed before being transmitted back to the sender of the request.

When the HUCL Software Stack on the requesting device receives 106 the device description, it is passed up to the Control Application. At this point the application has some basic information about the device and can make the decision as to whether it wished to communicate further with this device.

A design goal of HUCL is that it is suitable to operate on very simple devices, however the information necessary to fully describing a device is potentially quite complex. The list below shows the sort of information a device might want to provide as part of its description.

Device Type e.g. DVD

Vendor Name e.g. Philips

Model Number e.g. DVD1010/002

Serial Number e.g. AH06848032345

Vendor URL e.g. www.philips.com

For the simplest of control devices, such as the switch used in the example throughout this section, much of this information is probably redundant. It would however be of use on a higher end 'PDA' type remote control that has a screen where such information could be displayed to the user.

The processing of such descriptions on low-end devices can present a problem, since it would potentially need the storage (RAM) to cache the complete message as it was received. The problem is worse than it might at first seem, since the overall size of the description data shown above is indeterminate, much of the information is 'free text'; the vendor name could be very long, the URL could specify an exact page maybe even with parameters e.g. http://www.consumer.philips.com/global/b2c/ce/catalog/subcategory.jhtml?gro upId=VIDEO&divId=0&catId=DVD&subCatId=DVD-PLAYER The way in which this is overcome in HUCL is that the device description is split into two tiers of information. The first tier is a simplistic description of the device but identifying if further information is available. It does not contain any free text fields so the overall length of it is deterministic. The second tier of extended information is optional but provides additional information.

Figure 12:
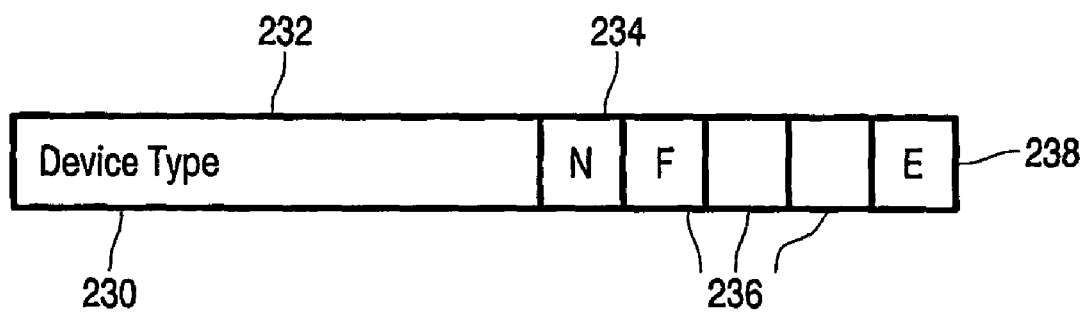
FIG. 12 illustrates a simple device description message.

Referring to FIG. 12, the Simple Device Description message 230 includes as fields the device type 232, a field 238 to indicate if Extended Device Description available and other fields 236 identifying key information e.g. a flag to indicate if event subscription is available. Optional integer field 234 represents the number of sub-devices of a composite device. The skilled person will appreciate that the message 230 may also include a header and footer which are omitted for simplicity. The message will include compressed XML tokens which are likewise omitted for clarity. The fields of the Simple Device Description are all of fixed length, so that they can be dealt with readily without decompression.

After receiving 106 (FIG. 3) the Simple Device Description 230 the Simple Device Description 230 is passed back to the HUCL Stack. If the Extended Device Description is available and the controller device requires it, the controller device Control Application may issue a "GetExtendedDescription" request 108 back to the device.

The HUCL Stack on the device receiving this request makes a Get Extended Description call into the Control Application requesting the Extended Device Description.

The Extended Device Description is passed back to the HUCL Stack, and makes its way back to the Control Application on the device that requested it. The Extended Description is then returned 110 to the requesting device.

If a GetExtendedDescription query is received on a device that does not provide an Extended Device Description the request is simply ignored.

Returning again to the switch/fitting example used throughout this section, from the point when the switch knows only the address of the fitting, the switch requests from the fitting its Simple Device Description. On receiving this it provides sufficient information such that the switch knows that it is talking to a light fitting that conforms to the standard fitting command set, it also knows that (for example) the fitting can't provide any Extended Device Description.

It is mandatory for a device application to provide a Simple Device Description to the HUCL Stack when requested. A device that does not provide any Extended Device Description can ignore any requests it receives for such information.

Included in the Simple Device Description returned by a device (when requested) is the device type field 232 that identifies the type of the device, e.g. TV, DVD, Light Fitting etc. The Device Type field 232 will identify to the controller (requesting the Simple Device Description) the instruction set that the device conforms to. HUCL devices identify themselves simply by their type identifier, they do not then go on to send messages to describe how they are controlled; there is no 'runtime' service description concept in HUCL. If a device identifies itself as a light fitting then the command set that can be called on this device is identified in the HUCL specification for a Light Fitting type device.

Figure 4:
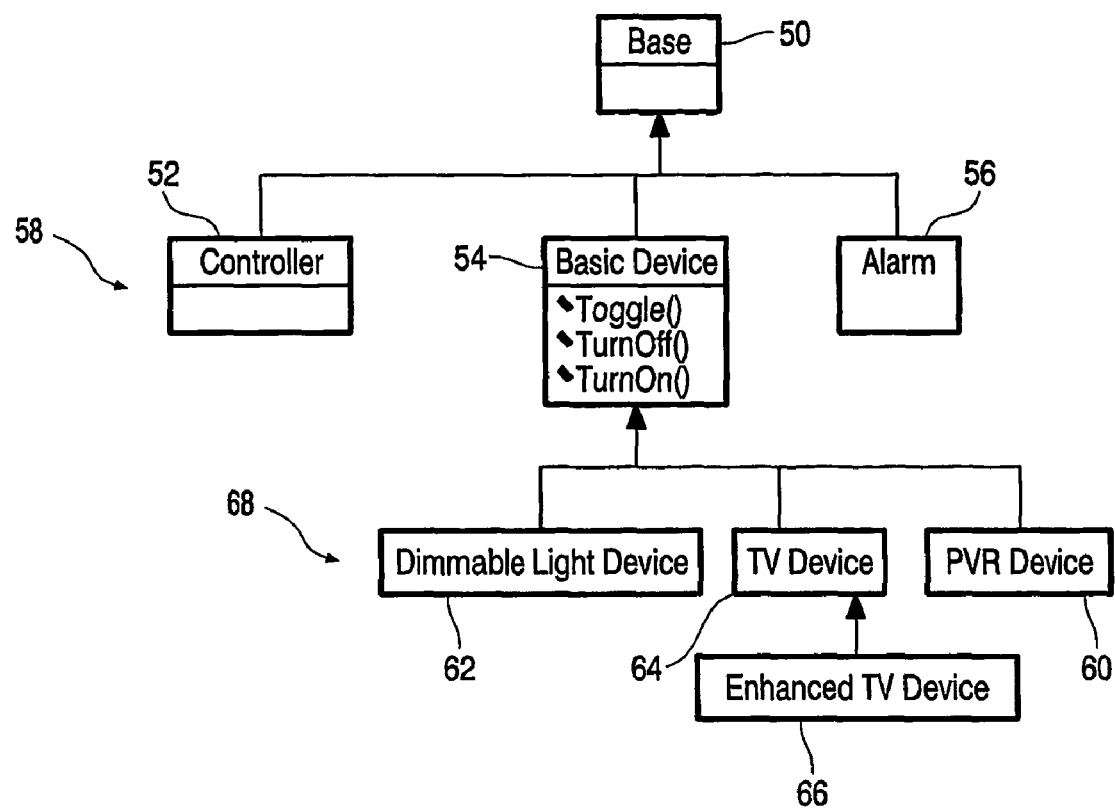
FIG. 4 is a schematic of the device type hierarchy.

Referring to FIG. 4, all device types depend from a base device type 50. Top level elements 58 include in this example the controller device type 52, a basic device type 54 for controlled devices and an alarm device type 56.

Subsidiary device types 68 depend from the basic device type. In the example, these include a TV device type 64, a dimmable light device type 62 and a PVR device 60.

The Device Type Classification was to produce a system aims to allow a simple controller to identify whether it could control a device to the extent of the controllers' capabilities.

A simple switch could be paired with a light fitting to turn on and off a light, but one might argue that the control functionality of the switch, that is its ability to turn a device on or off should be applicable to any device than can accept an on/off concept e.g. a TV, Heater, Printer.

One way in which this could be implemented is for the switch to have a list of all of the devices it knows how to control (turn On or Off), so when it requests the Simple Device Description for a device, it can look at the Device Type field in the returned description and determine if it is within its list of device types it knows how to control.

There are two significant drawbacks of this approach. Firstly the switch is a very simple device and it is undesirable for the application within it to have to hold a list of all possible devices that it could control, which would be quite large; secondly if a new type of device is created after the switch is produced (which can accept simple On Off functionality), then the switch will not have this new device type in its list, and will not believe it can control it i.e. it is not extensible.

HUCL classifies devices in a hierarchical way, shown in FIG. 4. The Device Type field 232 (FIG. 12) identifies the device within the hierarchy and so even if new devices were created, as long as it is derived from an the appropriate point within the hierarchy, a simple switch would still know that it could control it to an extent.

Devices that fall lower in the tree inherit the functionality of device types above it. It may be necessary to add some interpretation to the commands when applied to lower devices in the tree, for example the On/Off command when sent to a light will fairly obviously turn it On and Off, but the same commands when sent to a TV would place it in and out of standby mode.

The key benefit of the Device Type description is that even if the controller has no knowledge of the specific device type itself, it can determine the device from which it is derived, of which it may have some knowledge and hence may be able to control the device to some lesser extent (from the perspective of the device).

For example, consider the case that a light switch obtains the address of a device, it requests from this device the Simple Device Description; the Device Type field identifies the device as TV, but the switch does not recognise this as a device it knows about. However the switch can also establish from the description that it is a derivative of the 'Basic Device', which it does know about. The net result is that the switch can control the TV, to the extent of the controllers capabilities i.e. On and Off, despite knowing nothing about the device itself. The device could be a brand new category of device called an 'XYZ' invented long after the switch was manufactured, but so long as it is derived from a Basic Device the switch can still control it to an extent.

Although the Device Type Hierarchy may have just two tiers, and controller and basic device top level elements, at least one further tier and/or top level element is desirable. This caters for devices that would not comply with the functionality shown above in the Basic Device that is devices that do not have basic 'Turn On' 'Turn Off' functionality, e.g. an alarm. For illustrative purposes an 'Alarm' type device 56 has been shown in FIG. 4 and understandably this 'Alarm' device does not want to implement the normal On/Off functions that devices that are derived from Basic Device must have; it therefore sits at the same top level 58 in the hierarchy as the Basic Device 54 itself.

A second extension to the hierarchy is also shown in FIG. 4 i.e. the Enhanced TV Device 66 below the normal TV Device 64. Here the Enhanced TV Device inherits all of the functionality of both the Basic Device 54 and the TV Device 64, but also includes some extended functionality that is not present in a normal TV. A regular TV remote control designed to operate a normal TV Device can operate the Enhanced TV Device to the level of a normal TV Device functionality, but can't control the extended functionality.

The HUCL protocol accordingly provides an extensible mechanism for describing the Device Type and the devices above it from which it inherits functionality. Whilst the idea of a hierarchy of many layers might seem appealing, extending it beyond three or four levels will start to impact the size of the Simple Device Description.

Within HUCL it is possible to request a device description from a controller as well as a controllable device. When one device sends the "Get Simple Description" to a controller device (e.g. a switch) it is returned a Simple Device Description that contains a Device Type of "Controller". The controller device may also make available an Extended Device Description which provides further information such as the manufacturer, model number etc.

It is important to note that the Device Type returned by a controller device is simply "Controller" 52 there is no hierarchy of different controller type devices defined in the device type tree. The reason for this is again trying to keep the protocol and messages sizes small and simple. It might be felt that it would be possible to have different controller types derived from the basic Controller such as a Switch, TV Remote Control, PVR Remote Control, etc. However a problem would occur with intelligent controllers such as Universal Remote Controller that are capable of controlling a wide range of devices. To include all of the possible controller types in a simple device description would result in a potentially large message, which goes against the ideal of trying to make the initial Simple Device Description simple. To determine the exact capabilities of a controller device different mechanisms are employed.

The first means of determining the capabilities of a controller device is by the Extended Device Description which is permitted on a controller device and may contain information such as the device name e.g. "Universal Remote Control" and whilst this is textual information and is not directly interpretable by application software, it can be presented to the user to assist in making an informed choice about a controller.

The second means for a device to determine more about a controller is by querying it.

The use of querying is a powerful mechanism for drip-feeding information about a device that would otherwise, if supplied en-mass, overload the requestor.

Figure 5:
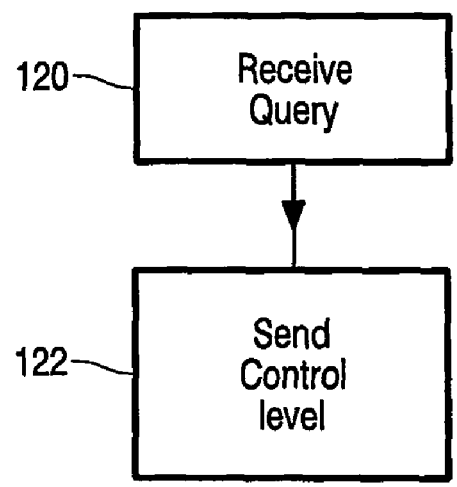
FIG. 5 shows the steps that a controller carries out to inform a controlled device of its control capability of that device.

Each device of controller type provides a means for other devices to query 120 whether it is able to control a specific Device Type (FIG. 5). The device type passed in the query is the same field as is used in the Simple Device Description i.e. as defined in the Device Type Hierarchy. The controller returns 122 the level to which it can control the device, by returning the lowest device type in a list stored in the controller memory 14 that is the device type passed in the query or from which that device type depends. For example, a simple switch is queried whether it can control an Enhanced TV Device. Based on the hierarchy illustrated in FIG. 4 above the reply is that it can control it to the level of Basic Device. The switch would typically itself know nothing about a device type of Enhanced TV Device, but since the Device Type also includes the inherited devices it would be able to identify the Basic Device and return this as the lowest hierarchically superior device type it is capable of controlling.

This may allow, for example, a PDA type controller device to act as a network management application to control the network.

Figure 6:
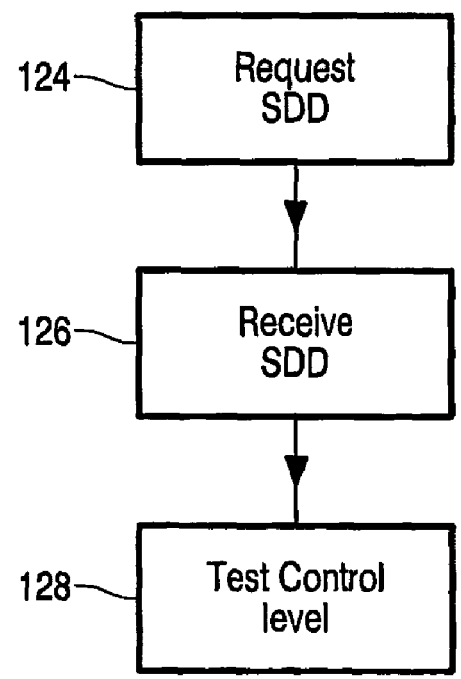
FIG. 6 shows the steps that a controller carriers out to determine its control capability of a controlled device.

The controller also implements an algorithm to determine if the switch can control a device type that is returned to it in a Simple Device Description (FIG. 6). When a switch discovers the address of a device it asks 124 the device for its simple device description, on receiving this information 126 the switch tests 128 whether it can control a device of this type to any degree, which is the same question it needs to respond to as a result of the querying process 120. The result is that the two query processes 120, 122, 124, 126, 128 do not add too much to the complexity of the simple switch device. The same applies to other simple devices.

It can be foreseen that there will be instances where a device may be a composition of a number of discrete devices all accessed via the same physical address e.g. all co-located on a single RF transceiver.

Examples of this type of device are a bank of individually switchable lights controlled through a single RF transceiver, or a TV with integrated alarm clock where both components are remotely controllable again through the same transceiver.

Figure 7:
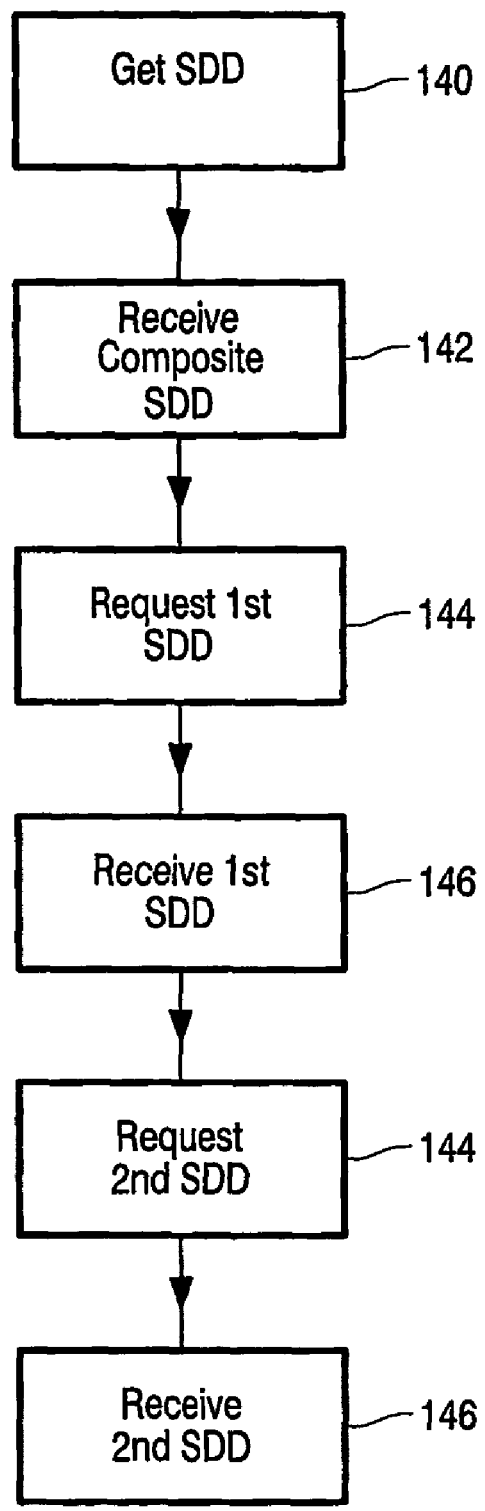
FIG. 7 is a flow diagram of the device discovery process for a composite device.

FIG. 7 illustrates the discovery process. The switch initially obtains the addresses of all devices known by the underlying transport medium, this includes the single address of the four individually controllable lights. The switch issues 140 a Get Simple Description command to the light bank, and the question that arises is what should the reply be? If four device descriptions are returned then this would be four times as much data than the switch would be expecting to receive. Returning multiple Simple Device Descriptions is not very scalable, and would, for example cause problems if there were 20 lights in the lighting bank.

The solution for this provided by HUCL is a specific Device Type for composite devices.

The composite device returns 142 its Simple Device Description including in the Device Type field 232 its device type as a "Composite Device". The Simple Device Description also identifies in field 234 that there are, in this example, four embedded devices within this single device.

The next stage, once the controller has identified that it is communicating with a composite device, is for it to establish what devices are embedded within it. The controller makes 144 further Get Simple Description requests to the composite device but addressing the requests to the specific embedded devices. The embedded devices return 146 their device descriptions.

Once the controller decides that it is going to control one of the embedded devices, all control commands are directed at the specific embedded device by including an embedded device ID with each command. Once the concept of the composite device has been established it opens up the possibility for a number of interesting device combinations that would be of benefit, some of these will be discussed below.

An example is a single device that consists of a lamp with integral switch, where the functionality of switch is exposed so as to be able to control other devices. This device, when queried for its Simple Device Description exhibits itself as a composite device, but when queried further one embedded device would be found to be a controller, and the other a controllable i.e. a Light Device. A number of such devices could be configured in such a way that operating the switch on any one of the devices causes the lights to be turned On/Off on all the devices e.g. turning on any one table lamp in the lounge causes all the table lamps in the lounge to come on.

Other possible combinations of composite device within the CE domain include for example a TV+video cassette recorder (VCR) or DVD and VCR. Each of these could if required describe itself as a composite of two devices.

Figure 8:
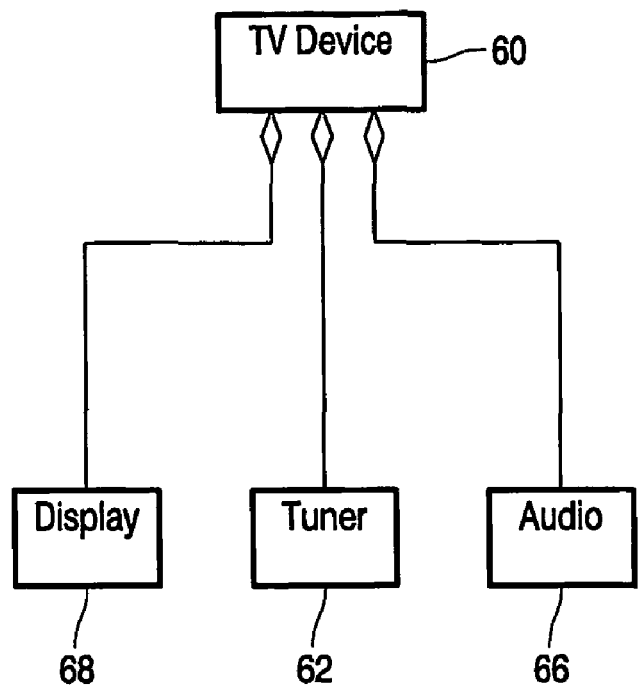
FIG. 8 illustrates an embodiment of a composite device.

Conceptually a Device consists of the core device plus zero or more sub-components, e.g. a TV Device 60 may for example consist of the TV Device 60 itself plus Tuner 64, Audio 66 and Display 68 sub-components (see FIG. 8).

Figure 9:
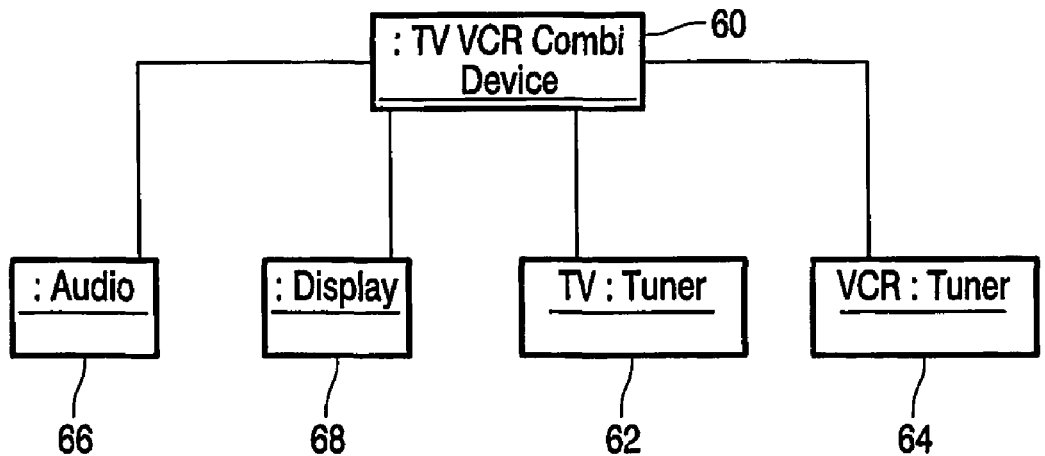
FIG. 9 illustrates another embodiment of a composite device.

It is also conceivable that a single device may have more than one instance of a sub-component e.g. a TV/VCR Combi Device may have two tuners 62, 64, one for the TV and one for the VCR (see FIG. 9), as well as audio 66 and display 68 components.

It might be felt that the use of XML and its compression and de-compression on the simplest of devices is a little heavyweight. The use of XML to describe the protocol provides a solution that is easily extensible for future enhancements, relatively simple to describe and understand, can easily handle structured information and is instantly compatible with the 'internet domain'.

Using a tagged compression technique on the XML (defined within HUCL) takes the relatively verbose protocol back down in size towards that of a traditional pure binary-based protocol, with some additional overhead to retain the content structure.

If one were to be presented with the a command in its compressed form it can be read in a similar manner that one would read any other binary based protocol, using information on the command structure and a table of definitions for data values. The only hint that the binary data may have originated from an XML based notation would be the presence of data to represent structure.

The HUCL specification defines that the messages is always transmitted through the transport medium in its compressed form. However on a simple device the application may operate directly on compressed messages, so eliminating the need on that device for the presence of the compression/de-compression software within the HUCL Software Stack. In this case the application would store (as part of the application image in ROM) the simple device description in its pre-compressed form, it would have a parser for the compressed protocol messages that it receives which would be similar in nature to any other binary protocol parser; any response messages would also need to be stored in their compressed form.

Using this approach the simplest devices such as the light switch and light fitting example used throughout this section can be implemented with a reduced software stack, and given that the number of commands that a simple device would need to understand and send is relatively small (turn light on, turn light off, toggle, get current state, get device description etc.) the overhead on the application software is minimal.

This offers a scalable solution to devices, where it is practical to implement the application to operate on compressed data this can be done, but when the device becomes more complex there will be a point where it becomes easier to include the compression/de-compression functionality in the stack and have the application use the protocol messages in their full XML notation. This cut off point is entirely down to the device designer and not defined or dictated by HUCL at all.

Figure 10:
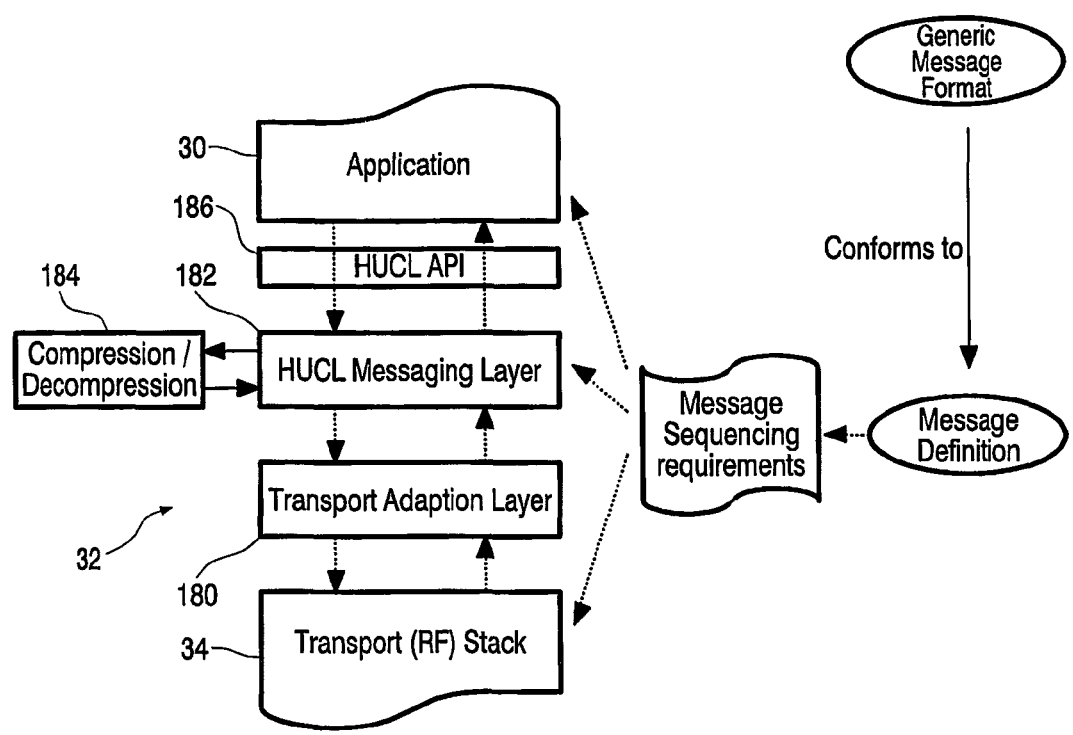
FIG. 10 shows the structure of the software.

FIG. 10 illustrates how the components that make up HUCL fit together. It will be appreciated that the components are software components recorded in memory.

The following sections discuss in more detail the layers that form the HUCL software stack 32 and the functionality that they provide.

As has been stated earlier HUCL does not rely on a specific transport protocol (unlike for example TCP/IP) but instead sits directly on top of a transport stack 34. Different transport stacks 34 will by their nature offer differing services to applications and through differing API's; the HUCL Transport Adaption Layer 180 acts as a buffer to the specific transport layer.

The Transport Adaption Layer 180 provides to the higher layers in the HUCL stack a consistent transport independent set of services. The requirements of this layer are defined in detail in the Protocol Specification.

The messaging layer 182 provides the bulk of the functionality of the HUCL Software Stack. Applications communicate with this layer through the HUCL API and it will perform the calls back in to the application when necessary (e.g. when data is received).

The messaging layer 182 also handles any initial error reporting and if necessary acknowledgements. Message ID's and Transaction ID's used to check for missing messages and for coupling messages to replies are also handled fully by this layer.

The Messaging layer 182 also makes use of the Compression/Decompression services 184 as and when a message needs to be compressed or decompressed. As discussed earlier an application deals exclusively with messages in their compressed form, no calls are made to these services and they can be removed from the runtime stack.

Quite simply the compression and decompression services provide the message layer with the means to convert the HUCL messages between their compressed and decompressed forms. It is possible for this component of the system to be absent in low-end devices where all data exchanges with the application are made with compressed messages.

The application programming interface API 186 is the interface through which all applications communicate with the HUCL software Stack. Communication is bi-directional in that the HUCL stack will make asynchronous calls back to the application as a result of certain events occurring in the lower layers e.g. message received via the transport stack.

HUCL is transport stack 34 independent, and what this means is that the HUCL messaging protocol can be built on top of a variety of transport stacks, both wired and wireless.

Since HUCL is designed as a lightweight protocol it is therefore most suited to lightweight transport stacks as well such as the emerging Zigbee (802.15.4) standard, but it can sit equally well on top of TCP & UDP/IP which opens up a wide range of other protocols, both wired (e.g. Ethernet) and wireless (e.g. 802.11b).

For a HUCL to be implemented on a transport stack 34 it must be possible to provide a number of services to the messaging layer of the HUCL stack. This means that these services can either be present in the transport stack itself or it must be possible to implement any missing services in the Transport Abstraction Layer of the HUCL stack. These services may cover aspects such as addressing, message delivery and device discovery (e.g. discovering the addresses of other devices on the network).

Figure 11:
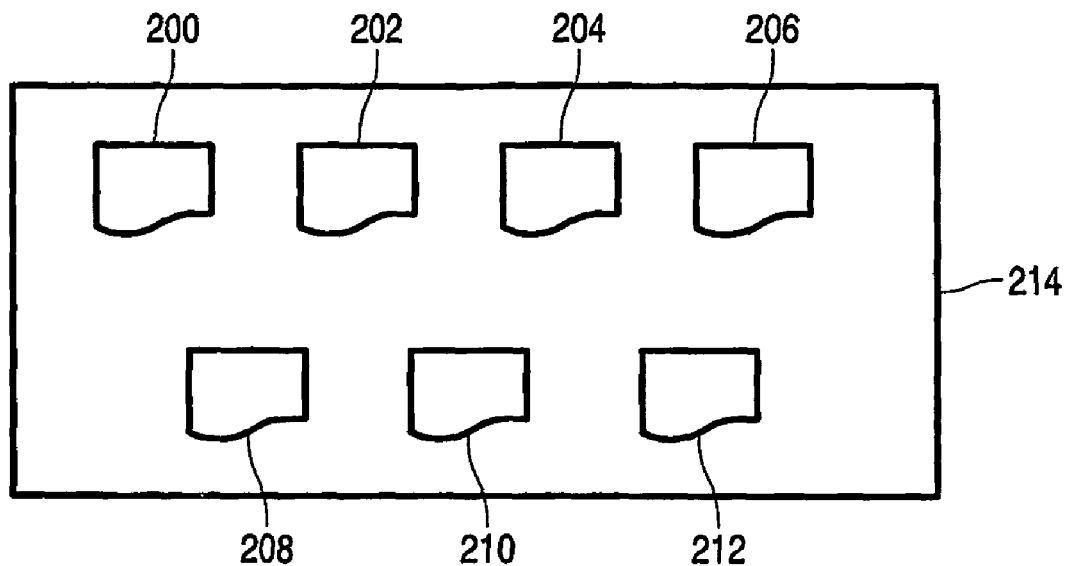
FIG. 11 illustrates the HUCL protocol.

The protocol itself is a document recorded on a medium 214, including the following information as shown in FIG. 11:

a generic HUCL message format 200 that defines the format to which all HUCL messages conform;

message definitions 202 defining the specific messages that form the control protocol.

message sequencing requirements 204 defining which messages are sent when, and the requirements of the application on receiving a message.

the HUCL API definition 206 defining the bi directional interface between HUCL and the application using it;

the messaging System requirements and functionality 208 of the HUCL software stack;

a compression algorithm 210 defining the mechanism for the compression of the HUCL messages, and a transport Adaption Layer definition 212 defining how the HUCL software stack is interfaced to a transport system (e.g. an RF stack). HUCL is accordingly not simply a message format definition but also encapsulates a message interchange and compression. The later four items in the list above form the HUCL software stack that would be present in a device, the first three items define the requirements to which the stack and application must conform.

From reading the present disclosure, other variations and modifications will be apparent to persons skilled in the art.

Such variations and modifications may involve equivalent and other features which are already known in the design, manufacture and use of networks and which may be used in addition to or instead of features described herein. Although claims have been formulated in this application to particular combinations of features, it should be understood that the scope of disclosure also includes any novel feature or any novel combination of features disclosed herein either explicitly or implicitly or any generalisation thereof, whether or not it mitigates any or all of the same technical problems as does the present invention. The applicants hereby give notice that new claims may be formulated to any such features and/or combinations of such features during the prosecution of the present application or of any further applications derived therefrom.

In particular, the specific subroutine names used in the examples may readily be varied. The computer program controlling the devices is shown as being recorded in memory 14 but the skilled person will realise that it could be recorded on many other types of record carrier such as a CD, floppy disc, etc.

Further, it will be noted that a very simple example of a light fitting and light switch has been extensively described in the forgoing. The skilled person will appreciate that many more complex control scenarios are also possible.

The invention claimed is:

1. A method of operation of networked devices including a first device and a second device, each of the first device and the second device comprising a transceiver for sending and receiving messages, a message handler and a memory for storing a simple device description message precompressed from human readable format, the method comprising the acts of:
   forming a hierarchy having predetermined top level elements at a top level including a controller device type and a basic device type, and at least one further level of subsidiary device types depending from the basic device type and inheriting properties of higher level device types on which the subsidiary device type depends, but not including any further level of subsidiary device types depending from the controller device type;
   transmitting from the first device to the second device a request for the simple device description message of the second device, the simple device description message being in the form of a token-compressed message compressed from a human-readable message format;
   reading by the message handler of the second device the simple device description message from the memory of the second device and sending it through the transceiver of the second device in response to the request from the first device, wherein the simple device description message has a defined overall length and does not contain any free text fields so that the overall length is deterministic;
   including in the simple device description message by the second device a device type value representing a type of the second device, wherein the device type value identifies a location of the second device within the hierarchy;
   transmitting from the second device to the first device the simple device description message including the device type value; and
   determining by the first device that the second device is controllable by the first device based on the device type value that identifies the location of the second device within the hierarchy, wherein the determining act is performed by the act of determining a lowest level of device type that either is the device type of the second device or is a higher level device type from which the device type of the second device depends,
   wherein the method further comprises the acts of:
   establishing an address of the second device for performing the act of transmitting the request to the second device; and
   receiving from the second device the simple device description message of the second device,
   wherein the top level includes a controller and the hierarchy does not include devices below the top level that are directly connected to the controller so that there is no hierarchy of the controller below the top level.

2. The method according to claim 1, further comprising the acts of:
   sending an extended device description query message to the second device requesting an extended device description from the second device; and
   receiving from the second device an extended device description of variable length.

3. The method according to claim 1, wherein the controller has a list of device types that the controller can control.

4. The method according to claim 3 further including the act of:
   determining an extent to which the controller can control the second device in the list of device types that can be controlled by the controller.

5. The method according to claim 4 further including the acts of:
   receiving a controller query message from another device including a requested device type to request whether the controller is able to control a device of the requested device type; and
   responding with a controller response message including a device type value representing the lowest level of device type in the list of device types that either is the requested device type or is a higher level device type from which the requested device type depends.

6. The method according to claim 1, comprising further comprising the act of:
   receiving a simple device description query message from another device requesting a simple device description; and
   transmitting to the other device the simple device description message of defined length.

7. The method according to claim 6 wherein the predetermined top level elements in the device type hierarchy further include a composite device type, and the networked device is of the composite device type having a functionality of an integer number of other devices, the method further comprising the act of:
   responding to a received simple device description query message by sending a simple device description message including the device type value representing the device as a composite device and further an integer sub-device number being the number of other devices.

8. A system, comprising:
   a plurality of networked devices each having a transceiver for sending and receiving network messages, a message handler and a memory for storing a simple device description message precompressed from human readable format, the simple device description message identifying a device type of a networked device, wherein the simple device description message has a defined overall length and does not contain any free text fields so that the overall length is deterministic; and wherein each networked device has a predetermined device type selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type;

at least one of the networked devices is a controller device with a controller device type; and at least one of the networked devices is a controlled device with a controlled device type of the basic device type or depending from the basic device type;

wherein the controlled device type identifies a location of the controlled device within the hierarchy, wherein the controller device is configured to determine that the controlled device is controllable by the controller device based on the controlled device type that identifies the location of the controlled device within the hierarchy by determining a lowest level of device type that either is the device type of the second device or is a higher level device type from which the device type of the second device depends, wherein the controller device is further configured to establish an address of the controlled device for transmitting a request to the second device for the simple device description message of the controlled device, and to receive from the controlled device the simple device description message of the controlled device, and wherein a top level of the hierarchy includes the controller device and the hierarchy does not include devices below the top level that are directly connected to the controller device so that there is no hierarchy of the controller device below the top level.

9. The system according to claim 8, wherein the plurality of networked devices includes:

at least one simple device without the capability to decompress messages, the at least one simple device interpreting directly compressed simple device description query messages; and at least one complex device including a message decompression arrangement for decompressing the messages and a message interpreter for interpreting the decompressed messages.

10. The system according to claim 8, wherein the predetermined top level elements further include a composite device type;

wherein the system includes at least one networked device of the composite device type having a functionality of a predetermined number of other devices, the predetermined number being an integer greater than or equal to 2;

and wherein each of the at least one networked device of the composite device type responds to an incoming device query message requiring a simple device description by sending a simple device description including the device type as a composite device and a sub-device number representing the predetermined number of other devices.

11. A networked device, including:

a transceiver for sending and receiving messages;

a memory storing a predetermined simple device description message in a form of a token-compressed message compressed from human readable format, wherein the simple device description message has a defined overall length and does not contain any free text fields so that the overall length is deterministic; and a message handler arranged to send or receive the simple device description message, wherein the message handler is configured to read the predetermined simple device description message from the memory and send it through the transceiver in response to an incoming device query message, the simple device description message including a device type value representing a type of a further device; the device type value being selected from a device type hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type, wherein the device type value identifies a location of the further device within the hierarchy so that a controller having the controller device type determines that the further device is controllable by the controller based on the device type that identifies the location of the further device within the hierarchy by determining a lowest level of device type that either is the device type of the second device or is a higher level device type from which the device type of the second device depends, wherein the controller device is further configured to establish an address of the further device for transmitting a request to the further device for the simple device description message of the further device, and to receive from the further device the simple device description message of the further device, and wherein a top level of the hierarchy includes the controller device and the hierarchy does not include devices below the top level that are directly connected to the controller device so that there is no hierarchy of the controller device below the top level.

12. The networked device according to claim 11, wherein the message handler is arranged to carry out the acts of:

establishing an address of the further device;

sending a simple device description query message to further device requesting a simple device description;

receiving from the further device the simple device description message of defined length including a device type value representing a type of the further device and a field indicating whether an extended device description is available;

and further arranged to optionally carry out the acts of:

testing the simple device description message to determine whether an extended device description is available;

sending an extended device description query message to the further device requesting an extended device description from the further device; and receiving from the further device an extended device description of variable length.

13. The networked device according to claim 11 wherein the message handler is arranged to carry out the acts of:

receiving a simple device description query message from another device requesting a simple device description; and sending to the other device the simple device description message of defined length, the simple device description message being in a form of a token-compressed message compressed from a human-readable message format.

14. The networked device according to claim 13, wherein the networked device is a controller device comprising a memory containing a list of device types that can be controlled by the controller for determining the extent to which the networked device can control another device of known device type by determining a lowest level device type in the list of device types that can be controlled by the networked device that either is the known device type or is a higher level device type from which the known device type depends.

15. The networked device according to claim 14 wherein the message handler is arranged to receive a controller query message from the another device including a requested device type value to request whether the controller is able to control a device of the requested device type; and to respond with a controller response message including a device type value representing the lowest level of device type in the list of device types that either is the requested device type or is a higher level device type from which the requested device type depends.

16. A method of operation of networked devices connected in a network including a controller device and a controlled device, the method comprising the act of:
classifying the networked devices in a hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type;
establishing an address of the controlled device;
transmitting by the controller device a request for a description message of the controlled device, the description message being in the form of a token-compressed message compressed from a human-readable message format;
in response to the request from the controller device, transmitting from the controlled device to the controller device the description message including a device type that identifies a location of the controlled device within the hierarchy, wherein the description message has a defined overall length and does not contain any free text fields so that the overall length is deterministic, and wherein the description message further includes an identification if further information is available; and
determining by the controller device that the controlled device is controllable by the controller device based on the device type that identifies the location of the controller device within the hierarchy, wherein the determining act is performed by the act of determining a lowest level of device type that either is the device type of the controlled device or is a higher level device type from which the device type of the controlled device depends, and
wherein a top level of the hierarchy includes the controller device and the hierarchy does not include devices below the top level that are directly connected to the controller device so that there is no hierarchy of the controller device below the top level.

17. The method of claim 16, further comprising the act of sending by the controller device a compressed message to the controlled device, wherein the controlled device performs the transmitting in response to the sending act without decompressing the compressed message.

18. The method of claim 16, wherein the controlled device comprises a composite device including sub-devices, and wherein the description message includes a field indicating a number of the sub-devices of the composite device.

19. The method of claim 18, wherein the field is included in the description message only when the controlled device comprises the sub-devices.

20. The method of claim 16, further comprising the act of requesting by the controller device the further information if the identification is included in the description message.

21. A non-transitory computer readable medium embodying computer instructions for operation of networked devices connected in a network including a controller device and a controlled device, wherein the computer instructions, when executed by a processor, configure the processor to perform the acts of:
classifying the networked devices in a hierarchy having predetermined top level elements including a controller device type and a basic device type, and at least one further level of subsidiary device types depending from the basic device type and inheriting properties of higher level device types on which the subsidiary device type depends, but not including any further level of subsidiary device types depending from the controller device type;
establishing an address of the controlled device;
transmitting by the controller device a request a description message of the controlled device, the description message being in the form of a token-compressed message compressed from a human-readable message format;
in response to the request from the controller device, transmitting from the controlled device to the controller device the description message including a device type that identifies a location of the controlled device within the hierarchy, wherein the description message has a defined overall length and does not contain any free text fields so that the overall length is deterministic, and wherein the description message further includes an identification if further information is available; and
determining by the controller device that the controlled device is controllable by the controller device based on the device type that identifies the location of the controller device within the hierarchy, wherein the determining act is performed by the act of determining a lowest level of device type that either is the device type of the controlled device or is a higher level device type from which the device type of the controlled device depends, and
wherein a top level of the hierarchy includes the controller device and the hierarchy does not include devices below the top level that are directly connected to the controller device so that there is no hierarchy of the controller device below the top level.

* * * * *